United States Patent
North Wood et al.

(10) Patent No.: US 9,413,556 B2
(45) Date of Patent: Aug. 9, 2016

(54) UNIFIED ACCOUNT LIST

(75) Inventors: Justin McLeod North Wood, Sunnyvale, CA (US); Pierre Jonathan de Filippis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 634 days.

(21) Appl. No.: 13/467,929

(22) Filed: May 9, 2012

(65) Prior Publication Data

US 2012/0306908 A1 Dec. 6, 2012

Related U.S. Application Data

(60) Provisional application No. 61/493,384, filed on Jun. 3, 2011.

(51) Int. Cl.
| | | |
|---|---|---|
| *G09G 5/00* | (2006.01) | |
| *H04L 12/58* | (2006.01) | |
| *G06F 3/0481* | (2013.01) | |
| *G06F 9/44* | (2006.01) | |
| *G06T 11/60* | (2006.01) | |
| *G06T 19/00* | (2011.01) | |
| *G06T 11/00* | (2006.01) | |

(52) U.S. Cl.
CPC .......... *H04L 12/5815* (2013.01); *H04L 51/043* (2013.01); *G06F 3/0481* (2013.01); *G06F 9/4446* (2013.01); *G06T 11/00* (2013.01); *G06T 11/60* (2013.01); *G06T 19/00* (2013.01)

(58) Field of Classification Search
CPC .......... G06T 11/60; G06T 19/00; G06T 11/00; G06F 9/4443; G06F 3/0481
USPC ....................................................... 345/619
See application file for complete search history.

(56) References Cited

U.S. PATENT DOCUMENTS

| | | | |
|---|---|---|---|
| 2002/0065894 A1* | 5/2002 | Dalal et al. ..................... 709/206 |
| 2002/0116461 A1* | 8/2002 | Diacakis .............. G06Q 10/087 709/204 |
| 2003/0013483 A1* | 1/2003 | Ausems ........... H04M 1/72522 455/556.1 |
| 2004/0017396 A1* | 1/2004 | Werndorfer ............. G06F 3/167 715/751 |
| 2004/0172481 A1* | 9/2004 | Engstrom .............. G06Q 30/02 709/239 |
| 2004/0193722 A1* | 9/2004 | Donovan ....................... 709/230 |
| 2006/0020677 A1* | 1/2006 | von Koch ...................... 709/207 |
| 2006/0168204 A1* | 7/2006 | Appelman et al. ............ 709/224 |
| 2006/0190546 A1* | 8/2006 | Daniell ......................... 709/206 |
| 2006/0280166 A1* | 12/2006 | Morris .................... H04L 67/32 370/352 |
| 2007/0226357 A1 | 9/2007 | McMurry et al. |
| 2007/0233875 A1* | 10/2007 | Raghav ................ G06Q 10/107 709/227 |
| 2007/0276937 A1* | 11/2007 | Chavda ............... H04L 12/5815 709/224 |
| 2008/0059627 A1* | 3/2008 | Hamalainen ........ H04L 12/5815 709/224 |
| 2008/0069331 A1 | 3/2008 | Levy |

(Continued)

OTHER PUBLICATIONS

Samir Chatterjee, et al., "Instant Messaging and Presence Technologies for College Campuses", 2005, pp. 4-13, IEEE.

(Continued)

*Primary Examiner* — Abderrahim Merouan
(74) *Attorney, Agent, or Firm* — Blakely, Sokoloff, Taylor & Zafman LLP

(57) ABSTRACT

A first status indicator indicating an aggregate status of a plurality of instant messaging accounts is displayed. A second status indicator adjacent to the first status indicator is displayed. The second status indicator indicates an alert status of one of the plurality of instant messaging accounts. The second status indicator is removed when the alert status of the one of the plurality instant messaging accounts ends.

18 Claims, 6 Drawing Sheets

(56) References Cited

U.S. PATENT DOCUMENTS

| | | | | |
|---|---|---|---|---|
| 2008/0165147 A1* | 7/2008 | Christie | ............... | G06F 1/1626 345/173 |
| 2008/0209528 A1* | 8/2008 | Francis | ............. | G06Q 30/0269 726/5 |
| 2008/0219423 A1 | 9/2008 | Lyman | | |
| 2009/0009343 A1* | 1/2009 | Boyer | ................... | H04L 12/581 340/573.1 |
| 2009/0010419 A1* | 1/2009 | Toebes | ............... | H04L 12/5815 379/265.03 |
| 2009/0265429 A1* | 10/2009 | Gestsson | ............ | H04L 12/5835 709/204 |
| 2010/0083142 A1* | 4/2010 | Patel et al. | .................... | 715/758 |
| 2010/0299628 A1* | 11/2010 | Har'El | ................. | G06F 9/4443 715/800 |
| 2012/0166980 A1* | 6/2012 | Yosef | ..................... | G06F 17/00 715/762 |

OTHER PUBLICATIONS

PCT International Search Report and Written Opinion of the International Searching Authority mailed Jul. 10, 2012 for PCT/US2012/040308 filed May 31, 2012.

International Preliminary Report on Patentability (Chapter I) for corresponding International Application No. PCT/US2012/040308, mailing date Dec. 19, 2013, 8 pages.

\* cited by examiner

UNIFIED ACCOUNT LIST

RELATED APPLICATIONS

This application claims priority to U.S. Provisional Patent Application No. 61/493,384, filed on Jun. 3, 2011.

FIELD OF THE INVENTION

Embodiments of the invention are generally directed toward instant messaging clients, and in particular, unifying a set of accounts.

BACKGROUND

Existing instant messaging (IM) clients integrate multiple accounts for the same user. For example, one IM client might integrate a user's AOL Instant Messaging (AIM) account, a user's Google Chat (gChat) account, and a user's Yahoo Instant Messaging (YIM) account. Each account has its own status, such as available, away, busy, disconnected, etc. Existing IM clients display a separate row in a window for each account. This consumes display space, which is especially problematic for smaller devices, such as smart phones or tablet computers.

SUMMARY

A first status indicator indicating an aggregate status of a plurality of instant messaging accounts is displayed. A second status indicator adjacent to the first status indicator is displayed. The second status indicator indicates an alert status of one of the plurality of instant messaging accounts. The second status indicator is removed when the alert status of the one of the plurality instant messaging accounts ends.

DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Existing IM clients display a separate account status for every IM account integrated into the IM client. This results in an excessive cost in terms of display space, which can be better used displaying, for example, which of the user's buddies are online. Embodiments of a unified account list reduce the amount of display space consumed by the user's various accounts by unifying the status display and displaying individual statuses when one of the accounts is in an alert state (e.g., disconnected from server).

Figure 1:
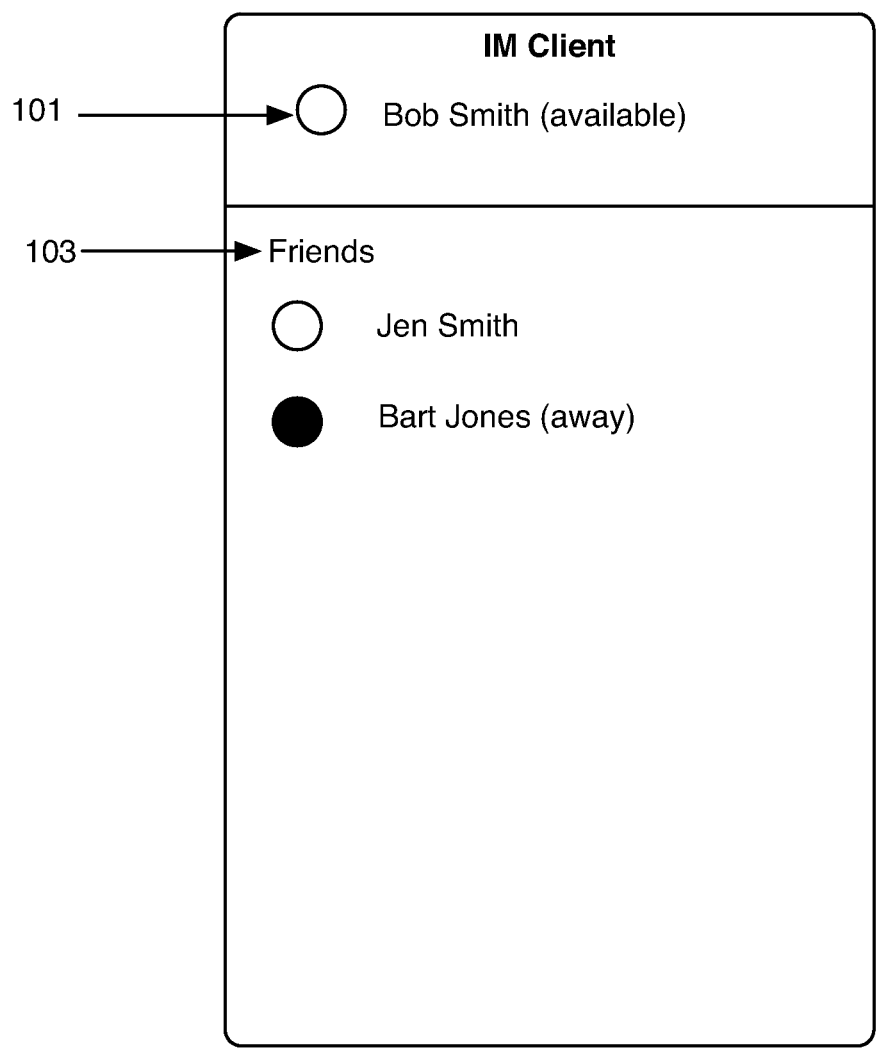
FIG. 1 is a diagram illustrating a normal account status according to an embodiment.

FIG. 1 is a diagram illustrating a user interface for an IM client 100 configured for Bob Smith. Row 101 shows a status indicator (empty circle) and Bob Smith's name and user-specified status "available." In one embodiment, the status indicator may be a green circle indicating that each account is connected to its respective IM server and is set to an "available" status. Other statuses are known in the art, such as "busy," "away," etc. Another aspect of an account's status is its connection to the corresponding IM server. Generally, an account is either connected or not connected. Below the status of Bob Smith's accounts is a list 103 of Bob's friends, which in FIG. 1 include Jen Smith and Bart Jones, who is away.

Multiple IM accounts may be integrated into the aggregate status displayed in row 101. For example, the aggregate status may cover an AIM account, a YIM account, and a gChat account. Each of these accounts has its own status made up of the account's status (available, busy, etc.) and the connection state (connected, disconnected). In FIG. 1, each of the integrated accounts has a user state of available and is connected to its respective server.

In some situations, the status of one of the integrated IM accounts may enter an alert state. Which states qualify as an alert state may be configurable by a user. Generally, alert states include an account being disconnected from appropriate IM server and entering a status different from the user-specified status. The user-specified status is indicated in row 101: "available." In some embodiments, the user specifies an aggregate status which the IM client attempts to set as the status on each integrated account.

Figure 2:
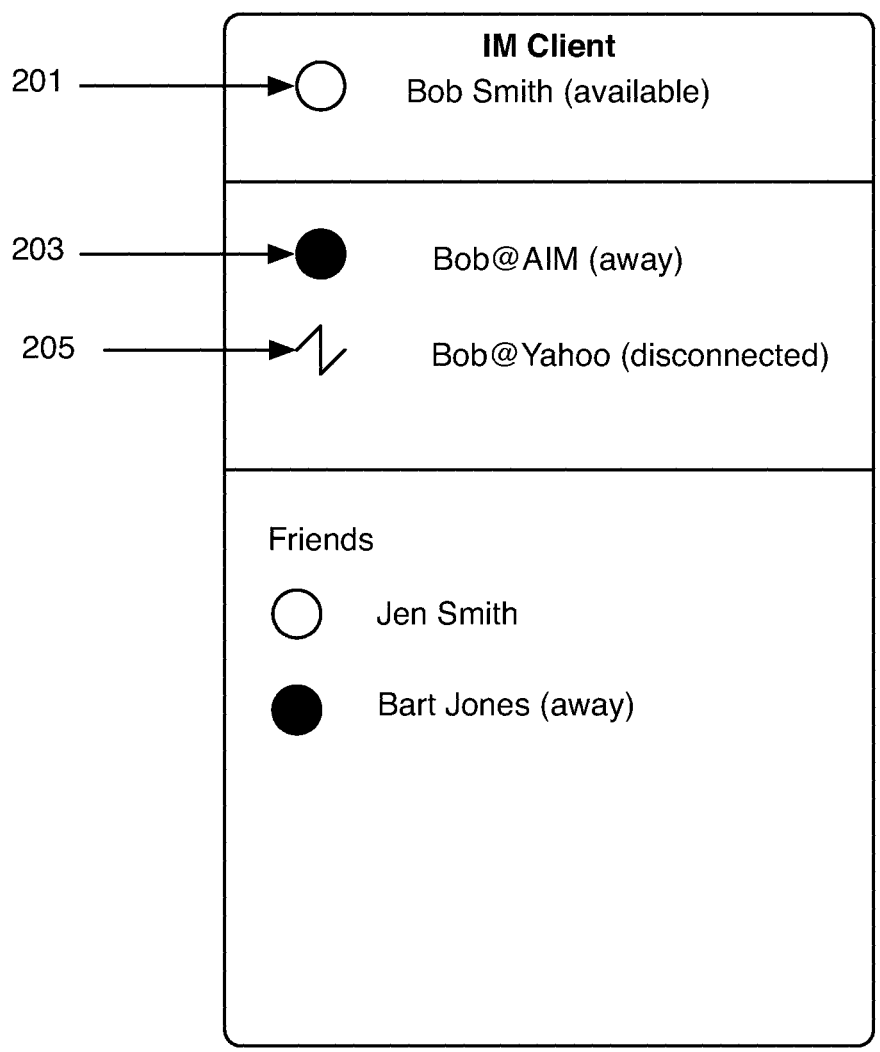
FIG. 2 is a diagram illustrating two accounts in an alert state according to an embodiment.

FIG. 2 illustrates two examples of accounts in an alert state in the IM client 100. Row 201 corresponds to row 101 in FIG. 1 and illustrates that one or more of the integrated IM accounts remain in the user-specified status and not an alert state. In some embodiments, row 201 may include an additional visual indicator if all integrated accounts are in an alert state (not shown). Row 203 indicates that an integrated AIM account has entered an alert state because the account status differs from the user-specified status of "available." Specifically, the AIM account has entered the "away" status. This may occur because the user has not sent a message for a certain period of time on the AIM account. In one embodiment, the AIM account is placed in the "away" state by the AIM server. The IM client may automatically override this status with "available," or may indicate to the user, as illustrated in FIG. 2, that the account has entered the away state. The IM client may allow the user to change the status of the AIM account back to available by clicking on the status.

Row 203 is an alert status indicator. The IM client displays row 203 in response to determining that the AIM account has changed status, for example, in response to a notification from the AIM server. In one embodiment, row 203 appears in an animated fashion by "sliding" in a downward direction from under the UI section that contains row 201. Similarly, if the status of the AIM account switches back to "available," for example, in response to the user updating the status, then the row 203 may be removed by "sliding" back under the UI section that contains row 201.

Row 205 illustrates another integrated account using the YIM service. As can be seen from the icon and the textual description, the YIM account has become disconnected from the YIM server. Row 205 may also "slide" into view when the account enters the alert state and "slide" away from view when the account exits the alert state. This conserves valuable display space by displaying the account-specific status indicators when the status of the corresponding account changes from the user-specified status of row 201.

Figure 3:
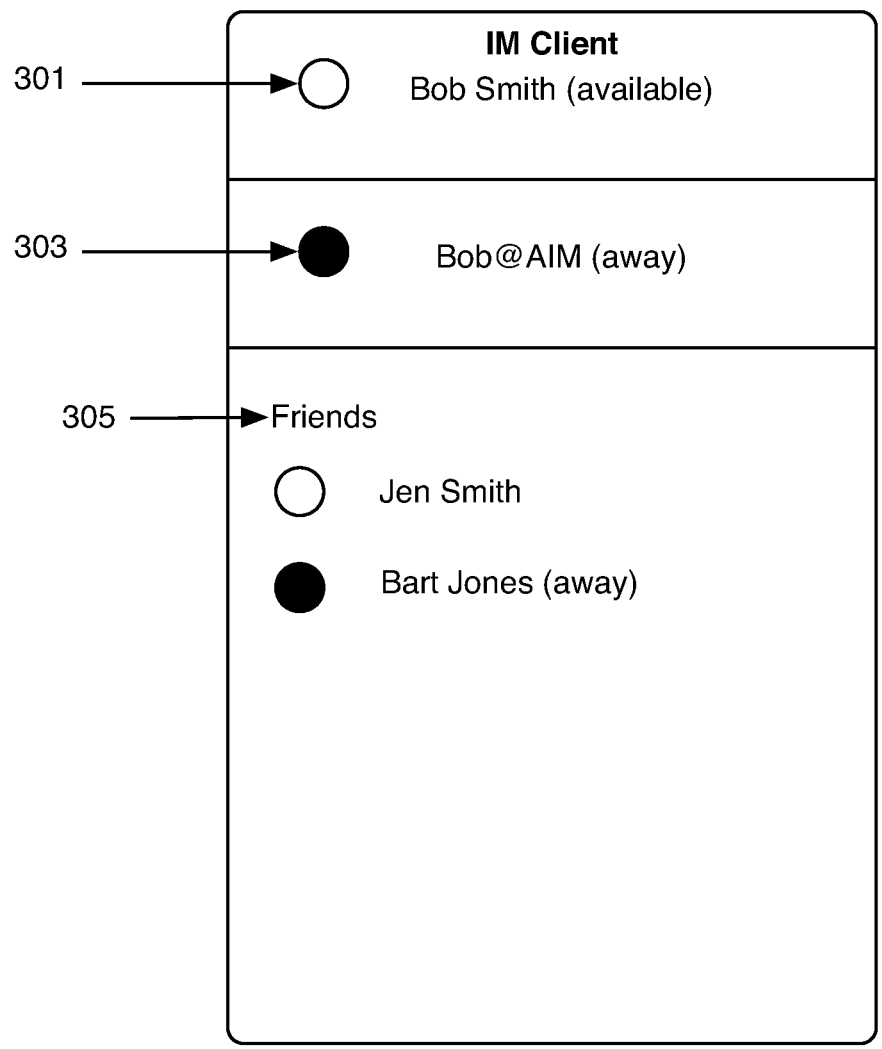
FIG. 3 is a diagram illustrating one account in an alert state according to an embodiment.

FIG. 3 is a diagram illustrating the IM client 100 after the YIM account has reconnected to the YIM server. Row 303 remains, indicating that the integrated AIM account is still has a different status than the user-specified status illustrated in row 301. Friends list 305 has moved upward into the space vacated by the removal of row 205 after the integrated YIM account reconnected to its server. In one embodiment, the friend list 305 expands in a "sliding" motion similar to how row 205 was removed. In other embodiments, different animations may be used.

Figure 4:
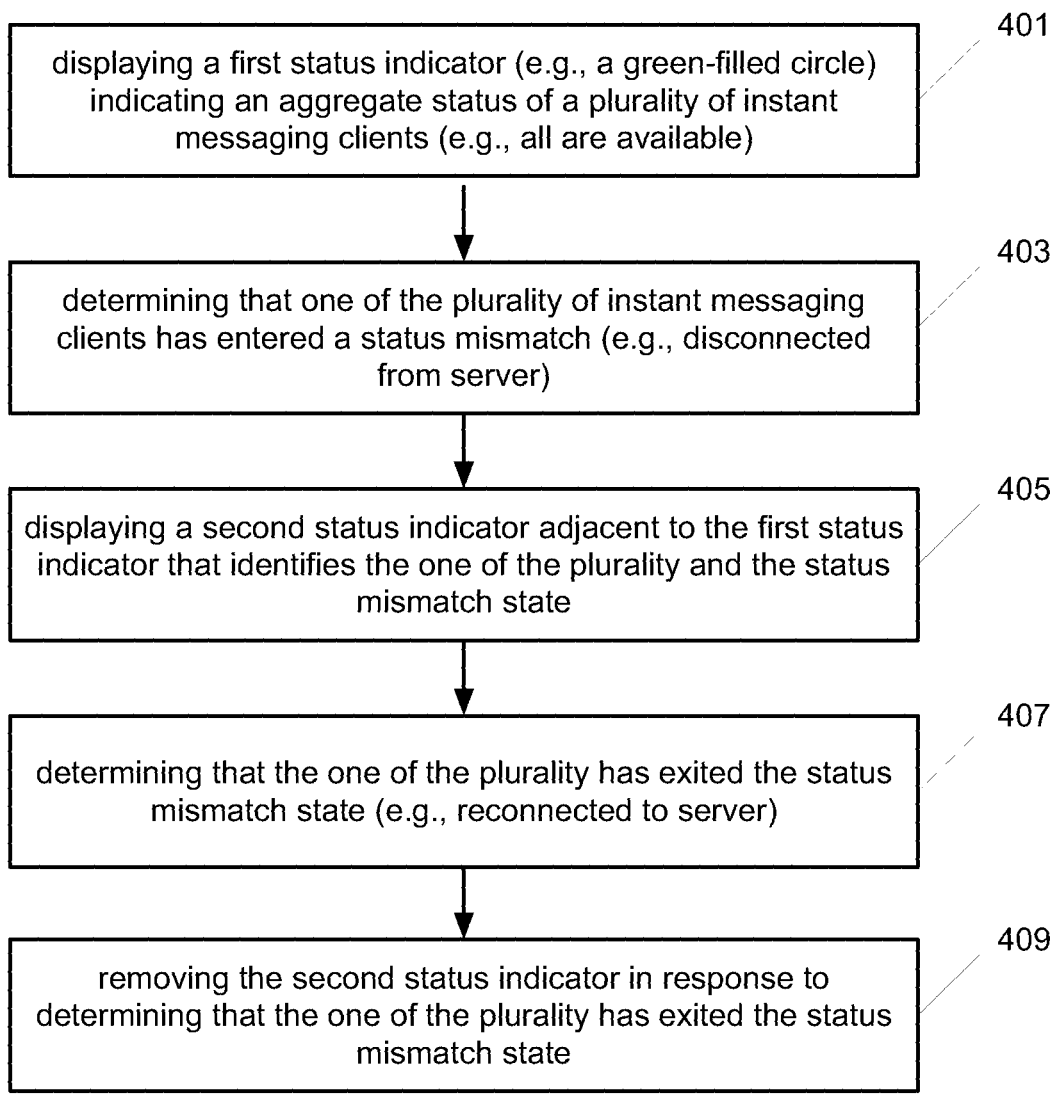
FIG. 4 is a flow chart illustrating a method of displaying a unified account list.

FIG. 4 is a flow chart illustrating a method of displaying a unified account list according to an embodiment of the invention. The method illustrated in FIG. 4 may be executed by a data processing system such as the system illustrated in FIG. 5 or the method may be executed by a device such as the device illustrated in FIG. 6.

At block 401, the method displays a first status indicator indicating an aggregate status of a plurality of instant messaging clients. In one embodiment, a user-specified status may be displayed adjacent to the first status indicator, such as "available" in row 101 of FIG. 1. In some embodiments, the user-specified status may be interactive, allowing a user to change the status of some or all of the IM accounts integrated into the aggregate status. For example, changing the user-specified status from "available" to "away" may cause each integrated IM account to change its status from "available" to "away."

At block 403, the method determines that one of the plurality of instant messaging clients has entered an alert state. For example, an IM client may become disconnected from its IM server, as in row 205 of FIG. 2.

At block 405, in response to determining that an IM account has entered an alert state, the method displays a second status indicator adjacent (e.g., a red-filled circle, a disconnected icon, etc) to the first status indicator that identifies the one of the plurality of instant messaging clients that has entered the alert state (e.g., "bob@YIM") and what the alert state is (e.g., "disconnected.") In some embodiments, the second status indicator is displayed in an animated fashion, such as "sliding" downward from under the first status indicator.

At block 407, the method determines that the one of the plurality of instant messaging clients has exited the alert status. In FIGS. 2 and 3, this is illustrated as the "bob@YIM" account reconnecting to the YIM server. At block 409, in response to determining that the IM client has exited the alert state, the method removes the second status indicator. In one embodiment, this is performed in an animated fashion in which the second status indicator slides upward underneath the first status indicator and the UI beneath the second status indicator slides upward into its place.

Figure 5:
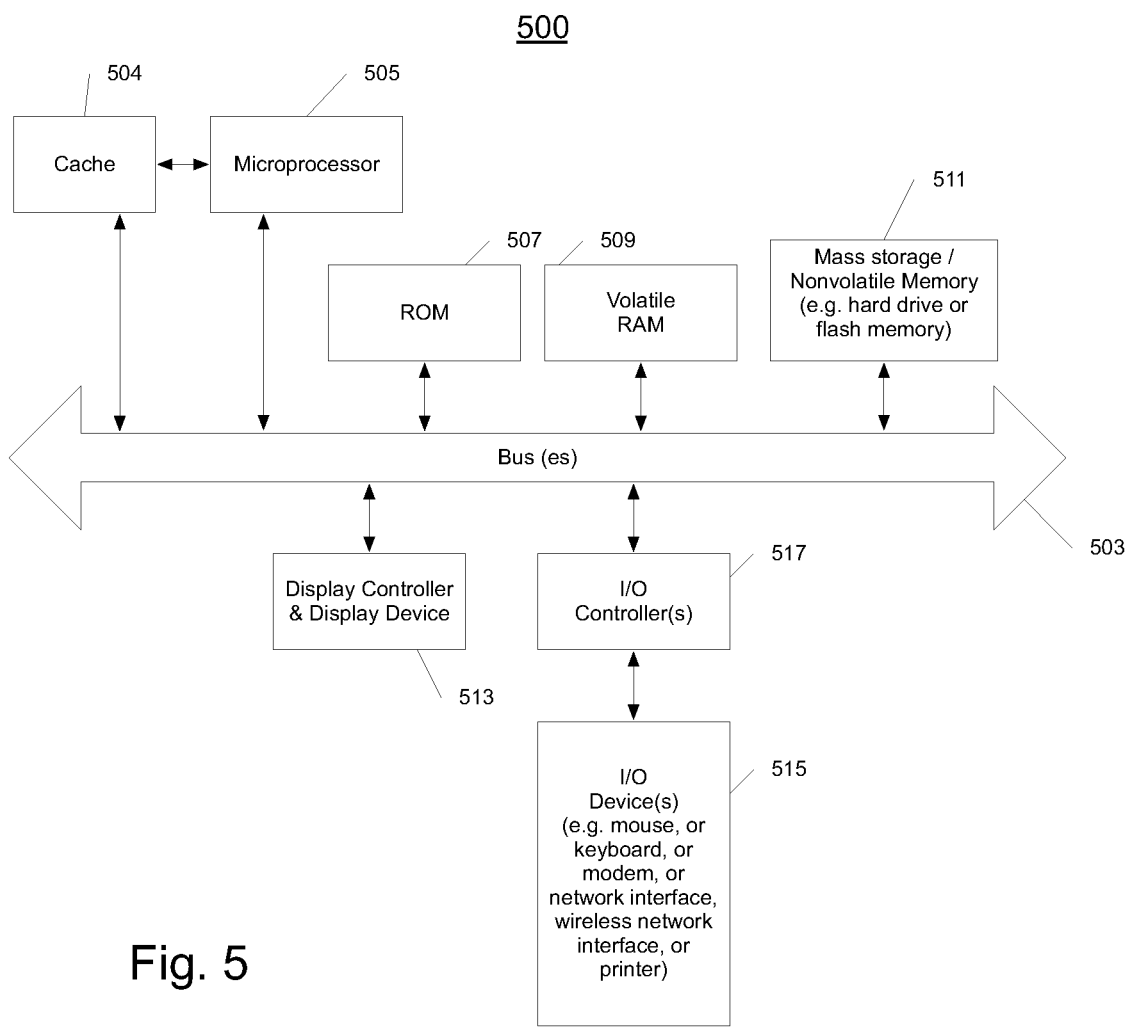
FIG. 5 is a diagram illustrating a data processing system that may be used with an embodiment of the invention.

FIG. 5 shows one example of a data processing system, which may be used with one embodiment the present invention. Note that while FIG. 5 illustrates various components of a computer system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 5, the computer system 500, which is a form of a data processing system, includes a bus 503 which is coupled to a microprocessor(s) 505 and a ROM (Read Only Memory) 507 and volatile RAM 509 and a non-volatile memory 511. The microprocessor 505 is coupled to cache 504. The microprocessor 505 may retrieve the instructions from the memories 507, 509, 511 and execute the instructions to perform operations described above. The bus 503 interconnects these various components together and also interconnects these components 505, 507, 509, and 511 to a display controller and display device 513 and to peripheral devices such as input/output (I/O) devices which may be mice, touch screens, touch pads, touch sensitive input devices, keyboards, modems, network interfaces, printers and other devices which are well known in the art. Typically, the input/output devices 515 are coupled to the system through input/output controllers 517. The volatile RAM (Random Access Memory) 509 is typically implemented as dynamic RAM (DRAM) which requires power continually in order to refresh or maintain the data in the memory.

The mass storage 511 is typically a magnetic hard drive or a magnetic optical drive or an optical drive or a DVD RAM or a flash memory or other types of memory systems which maintain data (e.g., large amounts of data) even after power is removed from the system. Typically, the mass storage 511 will also be a random access memory although this is not required. Mass storage 511 may also take the form of flash memory or other solid-state storage. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 503 may include one or more buses connected to each other through various bridges, controllers and/or adapters as is well known in the art.

Figure 6:
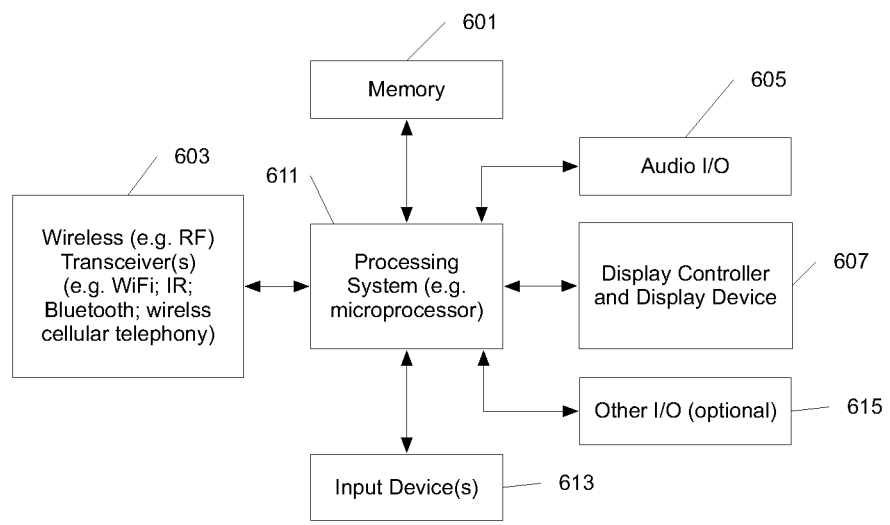
FIG. 6 is a diagram illustrating a device that may be used with an embodiment of the invention.

FIG. 6 shows an example of another data processing system which may be used with one embodiment of the present invention. The data processing system 600 shown in FIG. 6 includes a processing system 611, which may be one or more microprocessors, or which may be a system on a chip integrated circuit, and the system also includes memory 601 for storing data and programs for execution by the processing system. The system 600 also includes an audio input/output subsystem 605 which may include a microphone and a speaker for, for example, playing back music or providing telephone functionality through the speaker and microphone.

A display controller and display device 607 provide a visual user interface for the user; this digital interface may include a graphical user interface which is similar to that shown on a Macintosh computer when running OS X operating system software. The system 600 also includes one or more wireless transceivers 603. A wireless transceiver may be a WiFi transceiver, an infrared transceiver, a Bluetooth transceiver, and/or a wireless cellular telephony transceiver. It will be appreciated that additional components, not shown, may also be part of the system 600 in certain embodiments, and in certain embodiments fewer components than shown in FIG. 6 may also be used in a data processing system.

The data processing system 600 also includes one or more input devices 613 which are provided to allow a user to provide input to the system. These input devices may be a keypad or a keyboard or a touch panel or a multi touch panel.

The data processing system 600 also includes an optional input/output device 615 which may be a connector for a dock. It will be appreciated that one or more buses, not shown, may be used to interconnect the various components as is well known in the art. The data processing system shown in FIG. 6 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 600 may be a network computer or an embedded processing device within another device, or other types of data processing systems which have fewer components or perhaps more components than that shown in FIG. 6.

In the foregoing specification, displaying a unified account list has been described with reference to exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    in response to determining that a plurality of instant messaging accounts of a user are in a same status that comprises an aggregate status for the plurality of instant messaging accounts, displaying a single contact identifying the user to represent the plurality of instant messaging accounts of the user, and a first status indicator indicating that the plurality of instant messaging accounts of the user are in the aggregate status;
    in response to determining that a status of one of the plurality of instant messaging accounts of the user differs from the aggregate status, automatically updating the display to show the one of the plurality of instant messaging accounts of the user that has a status that differs from the aggregate status, and a second status indicator indicating an alert status of the one of the plurality of instant messaging accounts of the user, wherein the alert status indicates that the second status differs from the aggregate status; and
    in response to determining that the status of the one of the plurality of accounts has changed from the alert status to the aggregate status, automatically updating the display to remove the one of the plurality of instant messaging accounts and the second status indicator from the display.

2. The method of claim 1, wherein the aggregate status is asserted by the user.

3. The method of claim 1, wherein the alert status for the one of the instant messaging accounts of the user occurs when:
    the aggregate status is "available," "busy," or "away" and the one of the plurality of instant messaging accounts is disconnected from an instant messaging server;
    the aggregate status is "available" and the one of the plurality of instant messaging accounts is connected to an instant messaging server and the one of the plurality of instant messaging accounts has not sent an instant messaging for a predetermined period of time, indicating that the user is "away".

4. The method of claim 1, wherein displaying the second status indicator includes an animated movement of the second status indicator in a downward direction from the first status indicator.

5. The method of claim 1, wherein removing the second status indicator includes an animated movement of the second status indicator in an upward direction into the first status indicator.

6. The method of claim 1, further comprising:
    receiving an input adjacent to the first status indicator; and
    changing the aggregate status from a first status to a second status in response to the input, wherein the second status is propagated to one or more of the plurality of instant messaging accounts of the user.

7. A non-transitory machine readable medium storing instructions which when executed by a processor cause the processor to perform a method, the method comprising:
    in response to determining that a plurality of instant messaging accounts of a user are in a same status, that comprises an aggregate status for the plurality of instant messaging accounts, automatically displaying a single contact identifying the user and a first status indicator indicating that the plurality of instant messaging accounts of the user are in the aggregate status;
    in response to determining that a status of one of the plurality of instant messaging accounts of the user differs from the aggregate status, automatically updating the display to additionally show the one of the plurality of instant messaging accounts of the user that has a status that differs from the aggregate status, and a second status indicator indicating an alert status of the one of the plurality of instant messaging accounts of the user, wherein the alert status indicates that the second status differs from the aggregate status; and
    in response to determining that the status of the one of the plurality of accounts has changed from the alert status to the aggregate status, automatically updating the display to remove the one of the plurality of instant messaging accounts and the second status indicator from the display.

8. The non-transitory machine readable medium of claim 7, further comprising:
    receiving user input that sets the aggregate status of the plurality of accounts.

9. The non-transitory machine readable medium of claim 7, wherein the alert status for the one of the plurality of instant messaging accounts of the user occurs when:
    the aggregate status is "available," "busy," or "away" and the one of the plurality of instant messaging accounts is disconnected from an instant messaging server;
    the aggregate status is "available" and the one of the plurality of instant messaging accounts is connected to an instant messaging server and the one of the plurality of instant messaging accounts has not sent an instant messaging for a predetermined period of time, indicating that the user is "away".

10. The non-transitory machine readable medium of claim 7, wherein
    displaying the second status indicator includes an animated movement of the second status indicator in a downward direction from the first status indicator.

11. The non-transitory machine readable medium of claim 7, wherein removing the second status indicator includes an animated movement of the second status indicator in an upward direction into the first status indicator.

12. The non-transitory machine readable medium of claim 7, further comprising:
receiving an input adjacent to the first status indicator; and
changing the aggregate status from a first status to a second status in response to the input, wherein the second status is propagated to one or more of the plurality of instant messaging accounts of the user.

13. A data processing system comprising:
a processing system coupled to a memory programmed with executable instructions that, when executed, cause the data processing system to perform operations comprising:
in response to determining that a plurality of the instant messaging accounts of a user are in a same status, that comprises an aggregate status for the plurality of instant messaging accounts, automatically displaying a single contact on a display identifying the user and a first status indicator indicating that the plurality of instant messaging accounts of the user are in the aggregate status;
in response to determining that a status of one of the plurality of instant messaging accounts of the user differs from the aggregate status, automatically updating the display to additionally display the one of the plurality of instant messaging accounts on the display that has a status that differs from the aggregate status and a second status indicator indicating an alert status of one of the plurality of instant messaging accounts of the user, wherein the alert status indicates that the second status differs from the aggregate status; and
in response to determining that the status of the one of the plurality of accounts has changed from the alert status to the aggregate status, automatically updating the display to remove one of the plurality of instant messaging accounts and the second status indicator from the display.

14. The data processing system of claim 13, further comprising:
receiving user input that sets the aggregate status of the plurality of accounts.

15. The data processing system of claim 13, wherein the alert status of the one of the instant messaging accounts of the user occurs when:
the aggregate status is "available," "busy," or "away" and the one of the plurality of instant messaging accounts is disconnected from an instant messaging server;
the aggregate status is "available" and the one of the plurality of instant messaging accounts is connected to an instant messaging server and the one of the plurality of instant messaging accounts has not sent an instant messaging for a predetermined period of time, indicating that the user is "away".

16. The data processing system of claim 13, wherein displaying the second status indicator includes an animated movement of the second status indicator in a downward direction from the first status indicator.

17. The data processing system of claim 13, wherein removing the second status indicator includes an animated movement of the second status indicator in an upward direction into the first status indicator.

18. The data processing system of claim 13, further comprising:
receiving an input adjacent to the first status indicator; and
changing the aggregate status from a first status to a second status in response to the input, wherein the second status is propagated to one or more of the plurality of instant messaging accounts of the user.

* * * * *